UNITED STATES PATENT OFFICE.

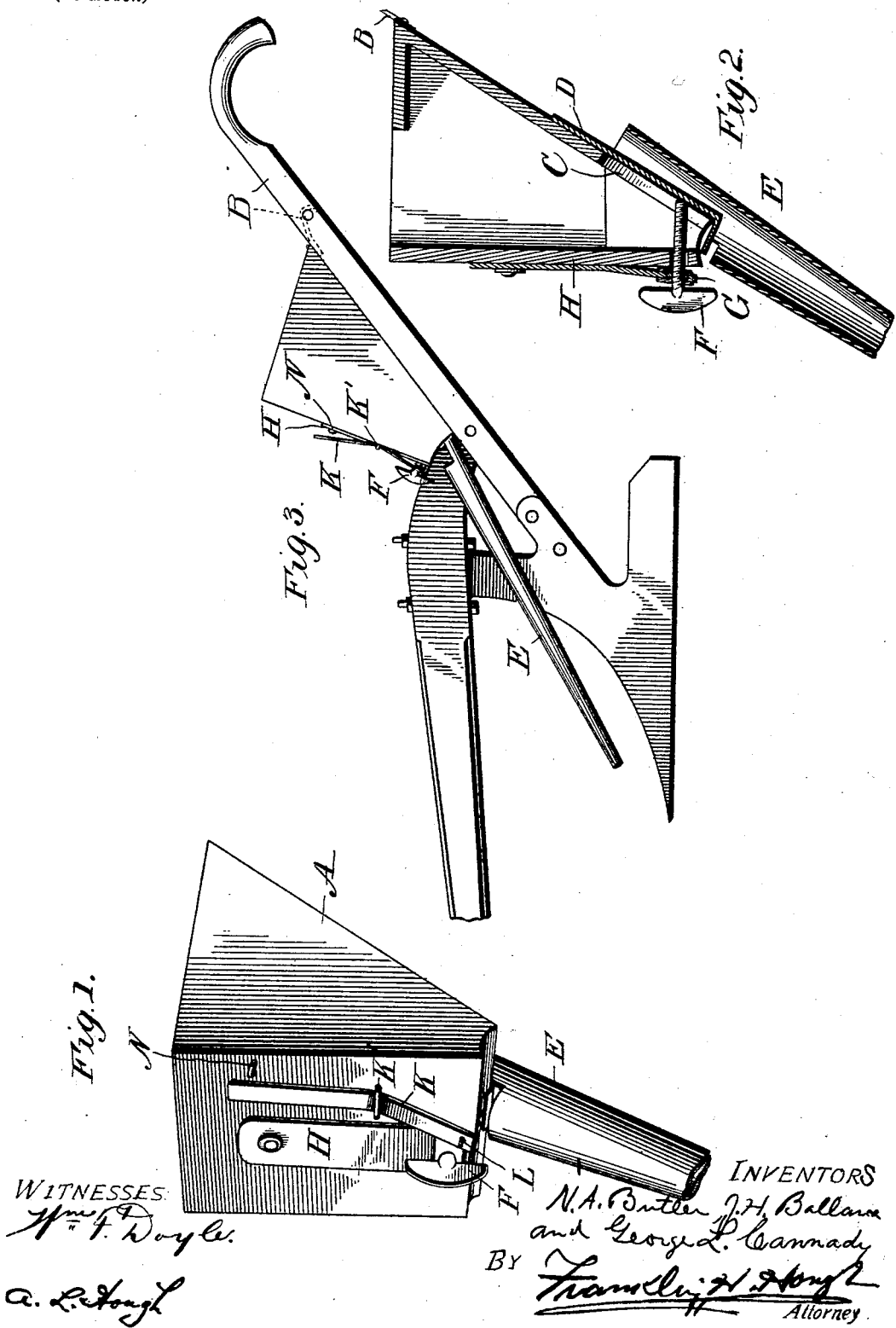

NEAL A. BUTLER, JOHN H. BALLANCE, AND GEORGE L. CANNADY, OF DUNN, NORTH CAROLINA.

FERTILIZER-DISTRIBUTER.

SPECIFICATION forming part of Letters Patent No. 677,061, dated June 25, 1901.

Application filed April 16, 1901. Serial No. 56,083. (No model.)

*To all whom it may concern:*

Be it known that we, NEAL A. BUTLER, JOHN H. BALLANCE, and GEORGE L. CANNADY, citizens of the United States, residing at Dunn, in the county of Harnett and State of North Carolina, have invented certain new and useful Improvements in Fertilizer-Distributers; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fertilizer-distributers, and especially to an attachment for plows or cultivators designed to be secured to the round of the handles, whereby the box of the device is supported, while the lower end rests upon the plow-beam and the spout adapted to convey the fertilizer to a location underneath the beam and in front of the shovel of the plow or cultivator.

The invention consists, further, in the provision of a fertilizer-distributer having a spring plate or bar one end of which is fastened to the fertilizer-box, while its free end is angled and adjustably held at the outlet end of the box and held in an adjusted position by means of a thumb-screw, means being provided to hold the angled end of said plate in a closed relation when it is not desired to feed out the fertilizer.

The invention will be hereinafter more fully described and then specifically defined in the appended claims, and is illustrated in the accompanying drawings, which, with the letters of reference marked thereon, form a part of this application, and in which—

Figure 1 is a perspective view of our improved fertilizer-distributer. Fig. 2 is a central longitudinal sectional view through the fertilizer-box, and Fig. 3 a side elevation of the distributer applied to a plow-beam.

Reference now being had to the details of the drawings by letter, A designates the box or hopper of the fertilizer-distributer, which may be of any suitable shape and which should have a hopper-bottom. To the rear upper edge of said box are secured hooks B, whereby the box may be supported on the round between the handles of a plow, while the lower or outlet end of the box is adapted to rest upon the beam, as shown. The bottom of the box, when the box is applied to a plow, is disposed at an angle, and said bottom is slotted, as at C. A spring-plate D is secured at one end to the under surface of said bottom, and the free end of said plate is bent substantially at right angles and is designed to close over the end of said slot and shut off the feeding of the fertilizer. To catch the fertilizer as it falls by gravity through said slot and over the edges of said spring-plate, a spout or trough E is provided, which is secured to the under surface of the box and is provided with a tapering snout which is slightly inclined, so as to direct the fertilizer to a location beneath the plow-beam.

The feeding of the fertilizer is regulated by means of a thumb-screw F, which is mounted in the threaded aperture G in the end of the flexible plate H, which is fastened at one end to the upper face of the box. This screw passes through an aperture in the front wall of the box and has its inner free end bearing against the spring-plate D, and by turning said screw a larger or wider space will intervene between the lower margin of said slot and the spring-plate to allow more fertilizer to escape than would be the case if the space were narrower. The flexibility of the material of which said plate is made will serve to hold it normally closed when the screw is held from contact therewith. In order to hold said screw from contact with the spring-plate, an angle-lever K is provided, which is pivoted, as at K', to the box and has one end connected by means of a link L to the flexible plate H. This lever when tilted down by pressure applied to its handle end may be caught under the hook N on the face of the box, thus holding the free end of the screw from contact with the spring-plate. This lever will be found serviceable for the convenience of the operator, who, standing between the handles of the plow or cultivator, can easily reach it for the purpose of throwing the screw from contact with the spring-plate when for any purpose it is desired to stop the feeding of the fertilizer, as when the end of a row is reached or it is desired to make a turn.

Having thus described our invention, what we claim to be new, and desire to secure by Letters Patent, is—

1. A fertilizer-distributer comprising a box with hopper-bottom adapted to be attached to the frame of a plow or cultivator, a feed-spout, a spring-plate secured at one end to said box adjacent to one end of a slot in the bottom of the box, said plate designed to normally close the outlet through said slot, and means for holding said plate so that more or less fertilizer may be fed out, as set forth.

2. A fertilizer-distributer, comprising a box with hopper-bottom, adapted to be attached to the frame of a plow or cultivator, a feed-spout secured over a slotted portion in the bottom of the box, a spring-plate, secured at one end adjacent to the end of said slot, its other end angled and designed to normally close said slot, a flexible plate secured to the outside of the box, a thumb-screw passing through a threaded aperture in said flexible plate, passing through the wall of said box, and its inner free end adapted to bear against the inner face of said spring-plate to hold the latter away from the bottom of the box, and means for holding said screw and flexible plate so that the screw will be held from contact with the spring-plate, as set forth.

3. A fertilizer-distributer, comprising in combination with the box, and means for attaching same to the frame of a plow, an angled spring-plate secured at one end to the bottom of the box adjacent to the end of a slot in said bottom, a flexible plate secured at one end to the top of the box, a thumb-screw passing through a threaded aperture in said flexible plate and bearing against the upper face of the spring-plate, a pivoted lever mounted on the box, and having a link connection with one end of said flexible plate, and a hook for holding down the handle end of the lever, as set forth.

In testimony whereof we hereunto affix our signatures in presence of two witnesses.

NEAL A. BUTLER.
JOHN H. BALLANCE.
GEORGE L. CANNADY.

Witnesses:
E. F. YOUNG,
V. L. STEPHENS.